Jan. 19, 1971 G. R. MONTGOMERY 3,555,718
FISHHOOK EXTRACTOR
Filed May 9, 1969
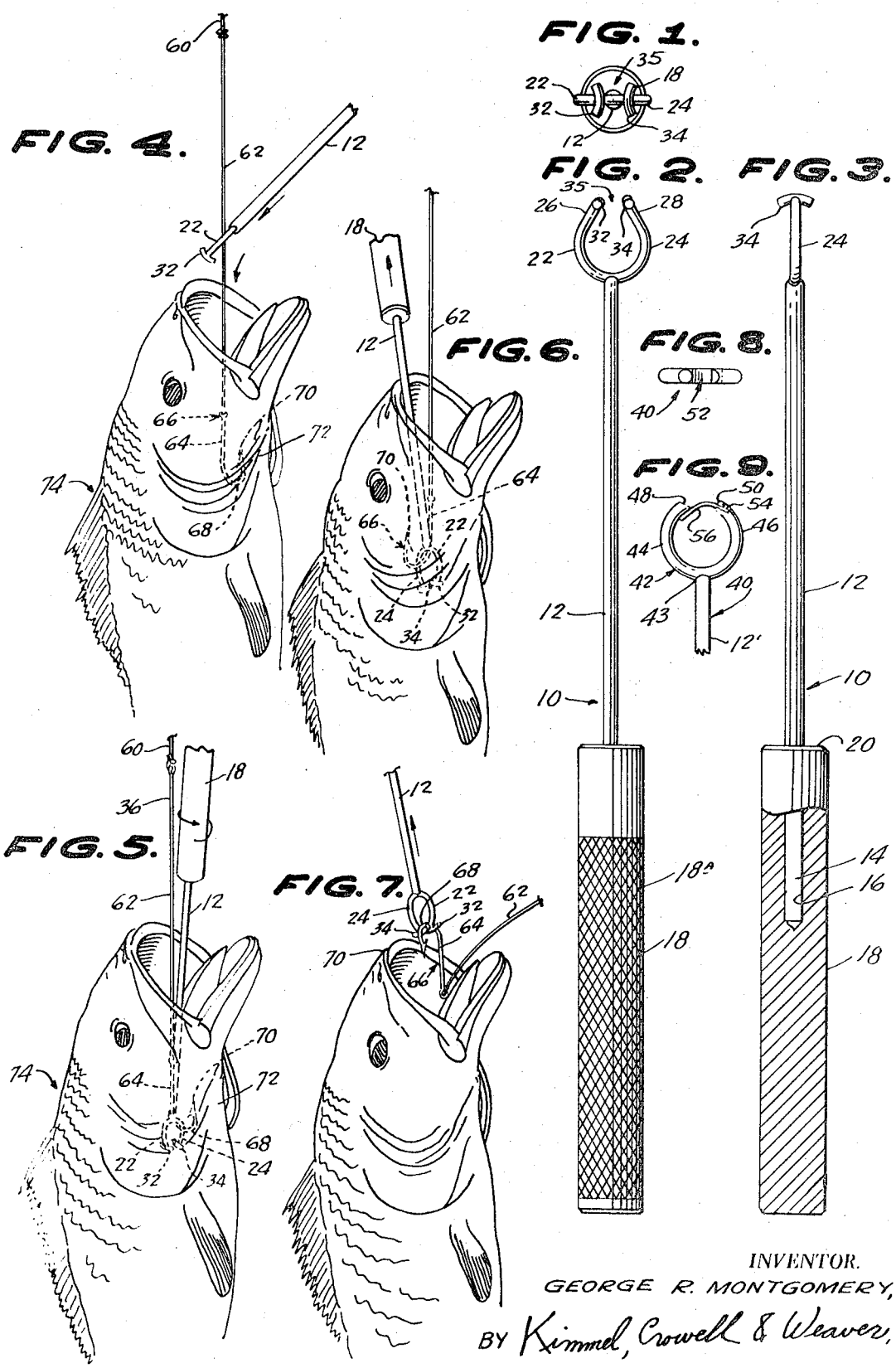
INVENTOR.
GEORGE R. MONTGOMERY,
BY Kimmel, Crowell & Weaver,
ATTORNEYS United States Patent Office 3,555,718
Patented Jan. 19, 1971

3,555,718
FISHHOOK EXTRACTOR
George R. Montgomery, 1152 Okeechobee Road,
West Palm Beach, Fla. 33401
Filed May 9, 1969, Ser. No. 823,391
Int. Cl. A01k 97/00
U.S. Cl. 43—53.5
9 Claims

ABSTRACT OF THE DISCLOSURE

Handle means terminating in bifurcated semi-circular arms, having coplanar longitudinal axes, the arms being adapted to track a fish line and its connected fishhook shank therebetween and to abut against the fishhook bight, whereby a turning movement of the handle means about its longitudinal axis twists and disengages the fishhooks from the mouth of a fish; and means projecting laterally from the distal end of each arm and from sides thereof substantially perpendicular to said plane, and engageable with the fishhook to effect the withdrawal thereof from the mouth of a fish.

BACKGROUND OF THE INVENTION

This invention relates generally to a fishhook extractor or disgorger to facilitate the removal of a barbed hook which has been swallowed by a fish and which is lodged fairly well back in the fish's mouth or well into its throat. The extractor or disgorging means according to this invention is operable to effect the extraction of the hook if only a simple hook and line are being used, or if the hook is connected to the body of an artificial fishing lure.

Those who are skilled in the art of fishing sports well know that it is sometimes most difficult to effect the release or removal of a barbed fishhook from the body of a fish caught thereon, and frequently even a skilled fisherman will experience much trouble, and perhaps distaste, in effecting the fishhook extraction.

SUMMARY OF THE INVENTION

It is one of the primary objects of this invention to provide a fishhook disgorger or extractor in the nature of a hand manipulative tool, the extractor, disgorger or tool being so constructed as to receive and track a fish line and a fishhook shank secured thereto, together with lever means cooperating with portions of the fishhook to effect the extraction and subsequent withdrawal of an embedded fishhook from the mouth or gullet of a fish.

It is among the further objects of this invention to provide an extractor, disgorger or hand tool of the type briefly described above, the device being non-complex in construction and assembly, inexpensive to manufacture, and which is rugged and durable in use.

Other objects and advantages of the device of this invention will become more apparent to those skilled in this art from a consideration of the following specification.

In the drawings:

FIG. 1 is a top plan view of a fishhook extractor, disgorger or tool constructed according to this invention;

FIG. 2 is a side elevational view of the device of FIG. 1;

FIG. 3 is an end elevational view, partly broken away to illustrate the details of the construction of the device;

FIG. 4 is a diagrammatic sketch showing the initial step in the utilization of the extractor;

FIG. 5 is a diagrammatical sketch illustrating the extractor moved to its operative position relative to the fishhook and just prior to its dislodgment;

FIG. 6 is a diagrammatic illustration showing the relative positions of the extractor and fishhook after the latter has been dislodged;

FIG. 7 is a further diagrammatic illustration illustrating the relative positions of the extractor and fishhook as the latter is being removed from the mouth of the fish;

FIG. 8 is a top plan view of a second embodiment of this invention; and

FIG. 9 is a fragmentary side elevational view of the device of FIG. 8.

Referring now more specifically to FIGS. 1 to 4, inclusive, of the drawing, which illustrate one preferred embodiment of this invention, reference numeral 10 designates, in general, a fishhook extractor, disgorger, tool or device constructed in accordance with the teachings of this invention. The extractor 10 is seen to comprise an elongated shank 12 preferably formed of a metallic or other suitable rigid material, the shank 12 having a substantially cylindrical transverse cross-sectional configuration. One end 14 of the shank 12 is adapted to be received within an elongated substantially hollow cylindrical pocket 16 which extends axially of an elongated substantially solid cylindrical handle 18 and which opens into the plane of one end 20 thereof. The exterior side of the handle 18 may be knurled as at 18A, if desired, to provide a high friction area when grasped in the hand of the user of the device 10.

The other end of the shank 12 terminates in a pair of bifurcated arms 22, 24, arcuately shaped with respect to their longitudinal axes, the arms 22, 24 also formed of a substantially solid rigid material and having a cylindrical transverse cross-sectional configuration. Each of the arms 22, 24 terminates in converging straight end portions 26, 28 with the outer ends thereof being disposed in spaced juxtaposition relative to one another to define an opening 35 therebetween. As will be seen from a consideration of FIGS. 1 to 4, inclusive, the longitudinal axes of the arms 22, 24, the longitudinal axis of the shaft or shank 12, and the longitudinal axis of the handle 18 all are contained in a common plane.

To serve a function to be described infra, each of the distal end portions 26, 28 terminates in an arcuate or concave-convex crosshead 32, 34, respectively. As is seen in FIGS. 1 to 3, inclusive, each of the crossheads 32, 34 is disposed in spaced parallel juxtaposition relative to one another and the crosssheads 32, 34 are of identical construction. Through reference to FIGS. 2 and 3 of the drawings, it will be seen that the crossheads 32, 34 have opposed ends which extend beyond the opposite sides of their respective associated arms 22, 24, and that each of the crossheads 32, 34 has its respective concave side facing generally in the direction of the handle 18. More specifically, an examination of these figures (FIGS. 1 to 3, inclusive) will disclose that the spaced apart crossheads 32, 34 have their respective arcuate axes contained in planes which converge towards one another in a direction away from the handle 18 and with the converging planes being disposed substantially perpendicular to the common plane of the longitudinal axis of the handle 18, the shank 12, and the arms 22, 24. The space between the crossheads 32, 34 define therebetween an opening 35. This completes the specific description of the first of the two preferred embodiments of this invention described and illustrated herein.

The second of the preferred embodiments is illustrated in FIGS. 8 and 9 and bears the general identifying reference numeral 40. This embodiment of the invention contemplates the usage of an elongated substantially solid cylindrical handle identical with the handle 18 of the previously described embodiment, and one end (not shown) of an elongated solid substantially rigid shank 12' is secured therein, all in the manner heretofore described. Reference numeral 42 generally denotes an arcuate ring fixedly connected at its apex end 43 by conventional means (not shown) to the other end of the shank 12'.

In this construction there is provided bifurcated arcuate arms 44, 46 having free adjacent ends 48, 50 which define an opening 52 therebetween. For a purpose to be described below, the free ends 48, 50 of the arms 44, 46, respectively, are planar, and the planes of the ends 48, 50 diverge outwardly and away from the adjacent end of the shank 12'. As in the preceding embodiment, the longitudinal arcuate axes of the arms 44, 46 are contained in a plane which includes the longitudinal axis of the shank 12' and its associated handle (not shown).

A slot 54 opens inwardly from the planar end 50 and extends diametrically across the free end of the arm 46.

Closure means for the opening 52 is provided and here bears the reference numeral 56. The closure means comprises an elongated substantially rectangular strip of flexible and resilient material, preferably formed of a plastic, the strip having one of its ends engaged in the slot 54, and its other end is bent to make tangential engagement with the inner side of the arm 44. The strip 56, in being bent in the manner illustrated in FIG. 9, takes an arcuate configuration around both its longitudinal and transverse axes. It should be further noted that the transverse axes of the closure means 56 is perpendicular to the plane of the axes of the arms 44, 46. In this described construction, the free end of the strip 56 will yield to move inwardly in the direction of the shank 12' upon application of pressure thereon from the exterior side thereof. The end of the strip 56 engaged within the slot 54 is fixedly secured therein as by crimping the slotted end of the arm 46 or other suitable and conventional means (not shown) may be utilized to anchor the strip 56 on the arm 46.

Having described in detail the construction of the two preferred embodiments of this invention, two modes of operation are related below which may be practiced with either one of the two devices. FIGS. 4 to 7, inclusive, illustrate the several steps of fishhook extraction utilizing the extractor of FIGS. 1 to 3, inclusive.

Referring now more specifically to FIG. 4, the initial operating step is shown wherein the user of the device has moved the extractor in the direction of the arrow to cause the fish line 60 to pass through the opening 35 to enter between the arms 22, 24 of the extractor 10, with the fish line 60 normally being guided to the junction point of the arms 22, 24 with the other or outer end of the shank 12. The line 60 is, of course, maintained under tension and as the same passes between the arms 22, 24, the extractor 10 is moved in the direction of the line 60 to reduce the angle therebetween. The extractor 10 is then pushed downwardly on the line 60 tracking the same, its connected leader 62, and the shank 64 of the conventional J-shaped fishhook 66 until one or the other of the arms 22, 24 engages the bight portion 68 of the fishhook 66. The barbed end 70 of the fishhook 66 is here illustrated as being embedded in the throat or gullet 72 of a fish 74.

The extractor 10 is now rotated in the direction of the arrow shown in FIG. 5 causing the arm 22 adjacent its inner end to engage one side of the bight 68 and an adjacent inner end of the arm 24 to bear against the adjacent opposed side of the shank 64. This applies a torque on the fishhook 66 causing the same to turn from its position shown in FIG. 5 to its position illustrated in FIG. 6 causing the barbed end 70 of the fishhook 66 to become dislodged from the gullet 72 of the fish 74. After the fishhook 66 has been so released, the user swings the extractor 10 clockwise from its position shown in FIG. 5 to its position shown in FIG. 6 and pulls upwardly thereon in the direction of the arrow shown in the last mentioned figure.

Tension on the line 60 may now be relaxed, as is shown in FIG. 7, and as the user continues to exert upward movement of the extractor 10 in the direction of the arrows shown in both FIG. 6 and FIG. 7, the fishhook 66 is forced to move to an inverted position such as is shown in FIG. 7, with the bight portion 68 thereof engaging over the crossheads 32, 34 at opposite sides of the arms 22, 24, respectively.

As an alternate method for effecting the disengagement or disgorging of the fishhook 66 from the throat or gullet 72 of the fish 74, the extractor 10 is engaged with the line 60, leader 62, shank 64 and bight portion 68 of the fishhook 66 in the manner above described with reference to FIGS. 4 and 5 of the drawing. The extractor 10 may now be rotated in the direction of the arrows shown in FIG. 5 to cause the arm 22 to engage against an adjacent portion of the fish's mouth to exert a leverage on the bight 42 to cause the fishhook to be dislodged for subsequent withdrawal. The turning movement as described above, in effect, pushes the fish 74 and the fishhook 66 in opposite directions relative to one anonther to effect the dislodgment of the barbed end 70 from the gullet 72 of the fish 74.

Either of the two above described methods may be utilized to extract the fishhook 66 from the fish 74. The size of the fish, the conditions under which the fish is being landed, and the user's own preference will dictate which of the two methods of extraction is preferable.

In utilizing the second preferred embodiment of this invention as is illustrated in FIGS. 8 and 9 of the drawing, the methods for effecting the extraction of the fishhook 66 are followed substantially in toto.

In using the device 40, the user aligns the opening 52 with the line 60 and forces the closure means or strip 56 thereagainst. Since the line 60 is under tension, the closure means or strip 56 will flex inwardly in a counterclockwise direction, reference being made to FIG. 9 of the drawing, and the line will then slip against the inner side or surface of the arm 44. The planar surfaces 48, 50 here act as fish line guides to facilitate the entry of the line into the opening 52.

As the arms 44, 46 continue to track the fish line 60, its connected leader 62, the shank 64 of the fishhook 66, the bight 68 thereof will become engaged substantially adjacent the apex 44, and the device 40 will now assume the position shown substantially in FIG. 5 of the drawing. The shank 12' is then turned, in the manner described above, causing the barbed end 70 of the fishhook 66 to become disengaged from the fish's gullet 72. In completing the extraction, the device 40 is moved upwardly in the direction of the arrows indicated in FIG. 7, and the bight portion 68 of the fishhook 66 will come to bear against the closure means 56. However, and despite the flexibility and resiliency of the closure means 56, the same will remain in its position of FIG. 9 since at this particular stage in the extraction steps the only weight carried by the closure means 56 is that of the fishhook, and this is rather negigible.

The handle means 18 in both embodiments of this invention have been described as being formed of a solid material. Under certain circumstances, and depending upon the size, weight and type of fish landed and from which the fishhook is to be extracted, it is frequently necessary to stun or immediately kill the fish. Upon such an occasion, the user of the extractor 10 or 40 will merely shift his grip from the handle means 18 to the shank means 12, 12' and strike the handle means 18 against the head of the fish to incapacitate the same against further movement.

While the two preferred embodiments of this invention have been described and illustrated with respect to a conventional line and baited fishhook, it will be understood that the same may be used to disgorge hooks used with artificial lures.

Having described the two preferred embodiments of this invention, the same are defined in the appended claims.

What is claimed is:

1. A fishhook extractor comprising
an elongated shank having a pair of opposed ends;
handle means fixedly connected on one of said ends of said shank;

the other end of said shank continuing into a pair of arcuately shaped bifurcated arms having converging but spaced apart distal ends;

said arms being engageable with the bight portion of a fishhook and operable to dislodge the fishhook from the body of a fish;

means on said distal ends of each of said arms also engageable with said bight portion of said fishhook to remove said fishhook from said fish, said last named means each comprising a crosshead fixedly connected on each arm, respectively, and disposed in confronting relationship relative to one another to provide an opening therebetween; and wherein said crossheads each include portions projecting beyond the opposed sides of their respective connected arms.

2. A device as defined in claim 1 wherein said handle means is of a solid material.

3. A device as defined in claim 2 wherein each of said crossheads is concave in the direction of said handle.

4. A device as defined in claim 3 wherein each of the remotely disposed ends of said arms terminate in a substantially straight distal end portion.

5. A device as defined in claim 4 wherein said handle means includes an elongated cylindrical member having an elongated substantially axially extending pocket formed therein opening into the plane of one end thereof to receive and fixedly secure said one end of said shank therein.

6. A device as defined in claim 5 wherein the longitudinal axes of said shank and said bifurcated arms are contained in a common plane, and the longitudinal axes of said crossheads are each, respectively, disposed in spaced planes substantially perpendicular to said common plane.

7. A device as defined in claim 6 wherein said handle means is knurled.

8. A fishhook extractor comprising an elongated shank;

handle means connected on one end of said shank;

the other end of said shank continuing into a pair of arcuately shaped arms having converging but spaced apart terminal ends to define an opening therebetween; and closure means for said opening comprising providing one of said arms with a slot extending inwardly from its said terminal end, a strip of resilient and flexible material, means fixedly connecting one end of said strip in said slot, and the other end of said strip spanning said opening and releasably engaging the other of said arms adjacent its said terminal end.

9. A fishhook extractor as defined in claim 8 wherein said terminal ends of said arms are planar with the planes of said ends diverging in directions away from said shank.

References Cited
UNITED STATES PATENTS

| | | | |
|---|---|---|---|
| 2,502,793 | 4/1950 | Kinney | 43—53.5 |
| 2,612,303 | 9/1952 | Butler | 43—53.5X |
| 2,644,268 | 7/1953 | Klinicki | 43—53.5 |

WARNER H. CAMP, Primary Examiner